US012082664B2

(12) United States Patent
Hakim

(10) Patent No.: US 12,082,664 B2
(45) Date of Patent: Sep. 10, 2024

(54) TRACKING WATCH

(71) Applicant: LASERWAVE GRAPHICS, INC., New Brunswick, NJ (US)

(72) Inventor: Albert Hakim, Eatontown, NJ (US)

(73) Assignee: LASERWAVE GRAPHICS, INC., New Brunswick, NJ (US)

( * ) Notice: Subject to any disclaimer, the term of this patent is extended or adjusted under 35 U.S.C. 154(b) by 291 days.

(21) Appl. No.: 17/855,913

(22) Filed: Jul. 1, 2022

(65) Prior Publication Data

US 2024/0000202 A1 Jan. 4, 2024

(51) Int. Cl.

*A44C 5/14* (2006.01)
*G04B 37/00* (2006.01)
*G04B 47/00* (2006.01)

(52) U.S. Cl.

CPC .......... *A44C 5/147* (2013.01); *G04B 37/0008* (2013.01); *G04B 47/00* (2013.01)

(58) Field of Classification Search

CPC .... A44C 5/147; G04B 37/0008; G04B 47/00; G04B 37/12; A44B 9/16; A44B 9/18
USPC .......................................................... 368/282
See application file for complete search history.

(56) References Cited

U.S. PATENT DOCUMENTS

2016/0274544 A1* 9/2016 Counas .................. G04B 37/12
2020/0249634 A1* 8/2020 Jones ..................... G04G 17/08

FOREIGN PATENT DOCUMENTS

CN 111920151 A * 11/2020
CN 113693351 A * 11/2021
WO WO-2022251483 A1 * 12/2022 ............... A45B 3/00

* cited by examiner

*Primary Examiner* — Edwin A. Leon
*Assistant Examiner* — Kevin Andrew Johnston
(74) *Attorney, Agent, or Firm* — Epstein Drangel LLP; Robert L. Epstein

(57) ABSTRACT

The assembly includes a watch, a watchband, a tracking device and a flexible retaining part formed to engage the watchband and to retain the watch and the tracking device. The part has a cylindrical shape wall with an open top edge spaced from an inwardly extending collar to define a recess to receive the tracking device. Frist and second arcuate wall extensions are connected by a member and define aligned openings through which the tracking device can be inserted into the retaining part, and which are adapted to receive the watchband. When the watch is situated in the top of the part, the tracking device is situated in the collar in the interior surface of the retaining part, and the watchband is inserted through the align openings, the tracking device is securely retained between the watchband and the watch. The watchband may be a "slap" watchband.

12 Claims, 7 Drawing Sheets

TRACKING WATCH

BACKGROUND OF THE INVENTION

1. Field of the Invention

The present invention relates to watches and more particularly to a watch assembly incorporating a tracking device.

2. Description of Prior Art Including Information Disclosed Under 37 CFR 1.97 and 1.98

Tracking devices of various types are available from multiple sources are known in the art. One example of a tracking device is sold by Apple under the name AirTag. Using technology, the users capable of monitoring the location of the tracking device communicating that location in real time through the internet to a smart phone, allowing the operator of the smart phone to keep track of the location of the device.

One popular use of a tracking device is to allow a parent to determine the location of a child on the parent's smart phone by having the child carry the tracking device.

The present invention is a digital watch assembly which securely retains a tracking device such that the wearer is much less likely to lose or misplace the tracking device. The invention is especially useful for tracking children but could be used by anyone whose location must be monitored, such as elderly or disabled individuals, sleepwalkers or the like.

BRIEF SUMMARY OF THE INVENTION

The invention is a tracking watch assembly. The assembly includes a digital watch with a top face, a watchband, a tracking device and a part formed of flexible material including silicone, rubber or plastic designed to engage the watchband and to retain the watch and the tracking device.

The retaining part has a wall with an exterior surface and an interior surface. The wall has a cylindrical shape with a round open top defined by an inwardly extending edge and a round open bottom defined by an inwardly extending collar spaced from the top edge of the wall. The top edge of the wall and the collar define a recess in the interior surface of the wall.

The wall has a first arcuate wall extension including an end and a second arcuate wall extension including an end. A connecting member extends between the first wall extension end and the second wall extension end. The wall extensions and the connecting member define aligned openings in opposite sides of the wall. The aligned openings are adapted to receive the watchband.

The watch has a circular exterior side including a first circumferential side portion and a second circumferential side portion. The first circumferential side portion has a diameter smaller than the diameter of the second circumferential side portion. When the watch is received within the retaining part wall, the second circumferential side portion of the watch is situated within the recess. In that position, the first circumferential side portion of the watch is situated within the inwardly extending edge of the wall and the top face of the watch is visible through the open top of the retaining part.

The tracking device is inserted into the retaining part through one of the aligned openings. It has a circular exterior wall. When the device is situated within the collar of the interior surface of the retaining part, and the watchband is extended through the aligned openings, the tracking device is securely retained and hidden between the watchband and the watch.

The watchband is preferably a "slap" type watchband which has a spring-like metal strip embedded within a plastic cover. The plastic cover may be imprinted with colorful images to be attractive to a child.

The retaining part itself may be translucent, opaque, or colored.

BRIEF DESCRIPTION OF THE SEVERAL VIEWS OF DRAWINGS

To these and to such other objects that may hereinafter appear, the present invention relates to a tracking watch as described in detail in the following specification and recited in the annexed claims, taken together with the accompanying drawings in which FIG. 1 is an exploded view of the present invention showing the watch, tracking device, watchband and the retaining part;

DETAILED DESCRIPTION OF THE INVENTION

Figure 1:
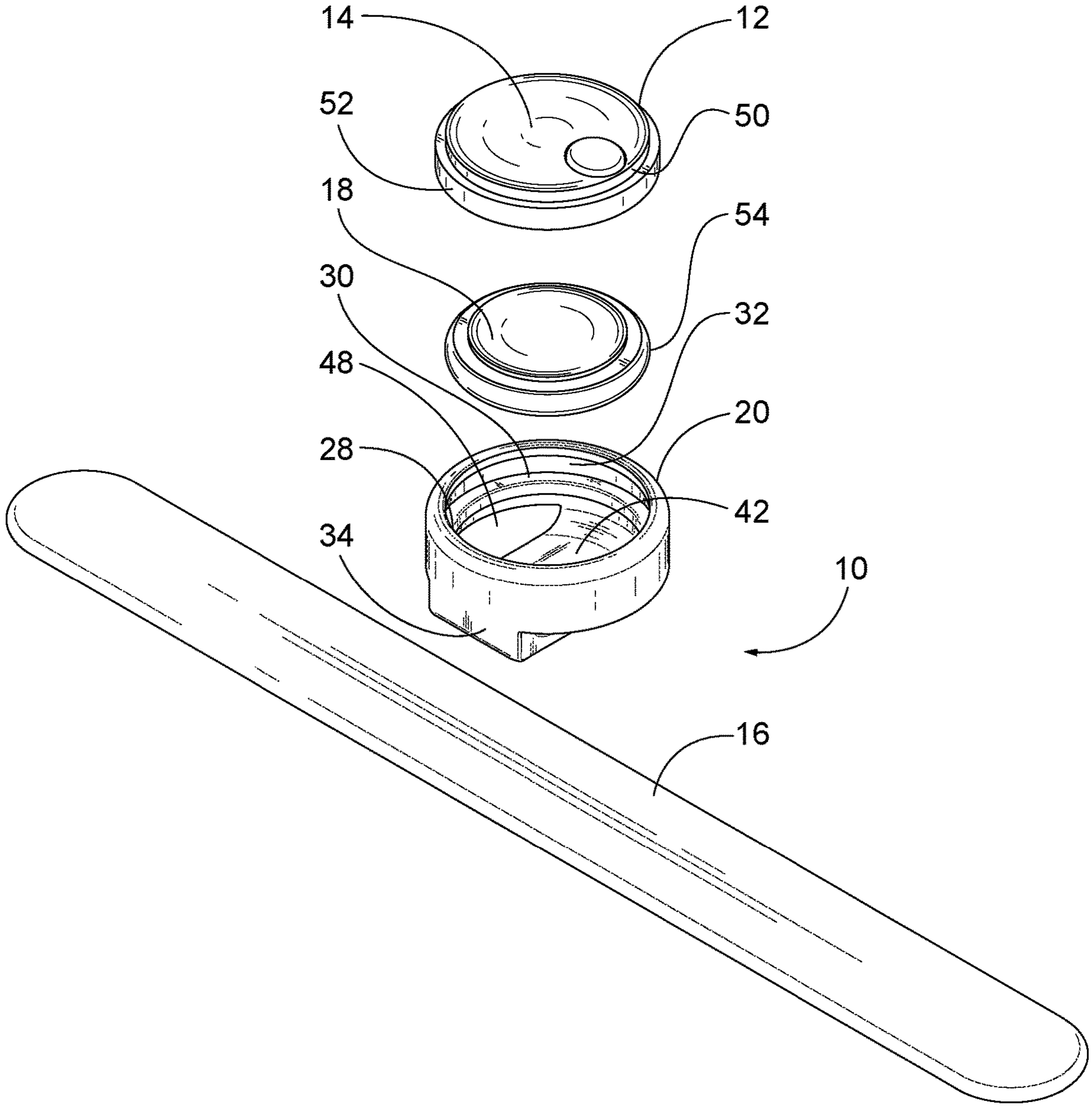

The tracking watch assembly 10 illustrated in FIG. 1 includes a digital watch 12 with a top face 14, a watchband 16, and a tracking device 18. A part 20, formed of flexible material including silicone, rubber or plastic, is provided to engage watchband 16 and to retain watch 12 and tracking device 18.

Figure 2:
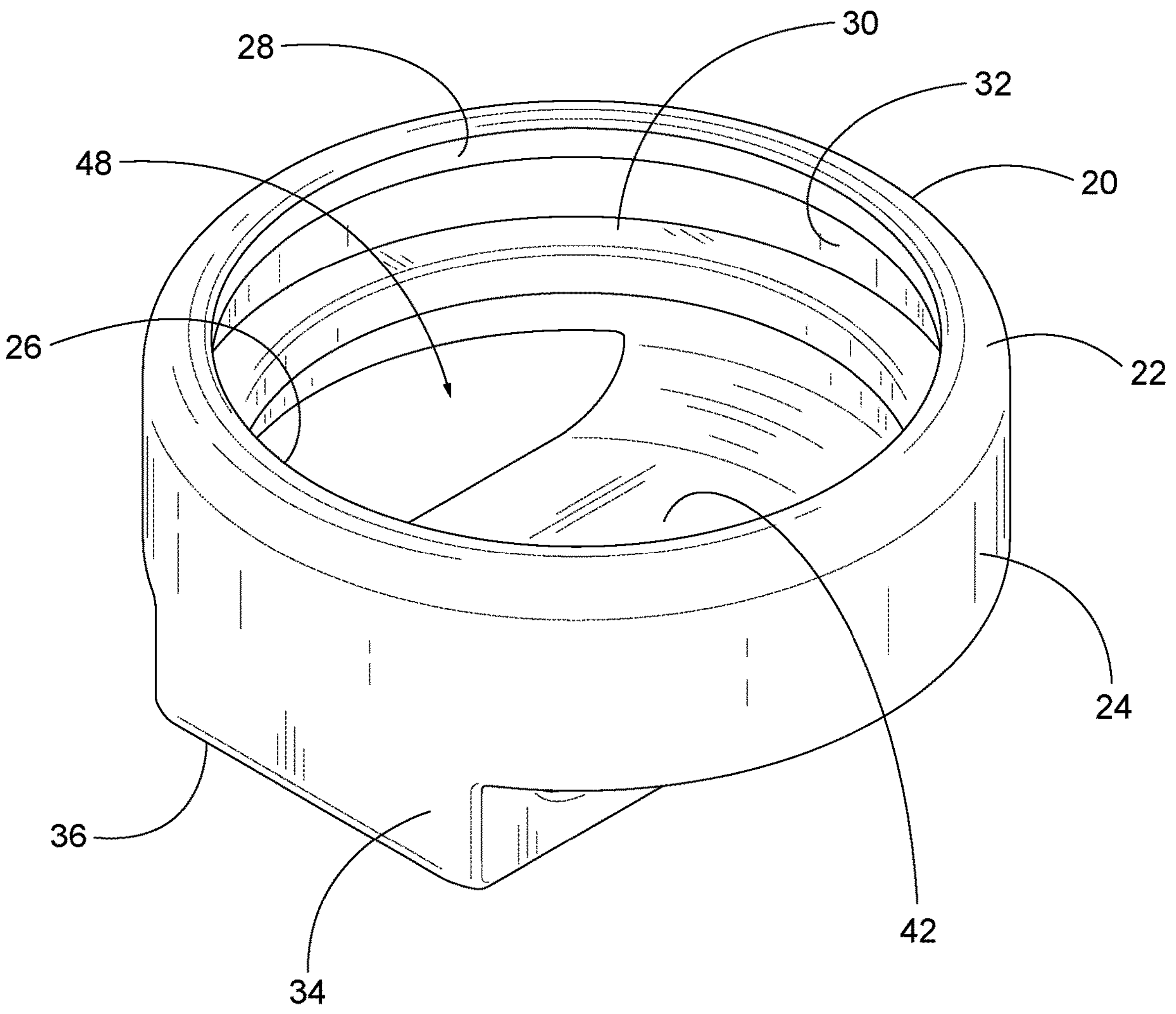
FIG. 2 is an enlarged perspective view showing the top and one side of the retaining part.
Figure 3:
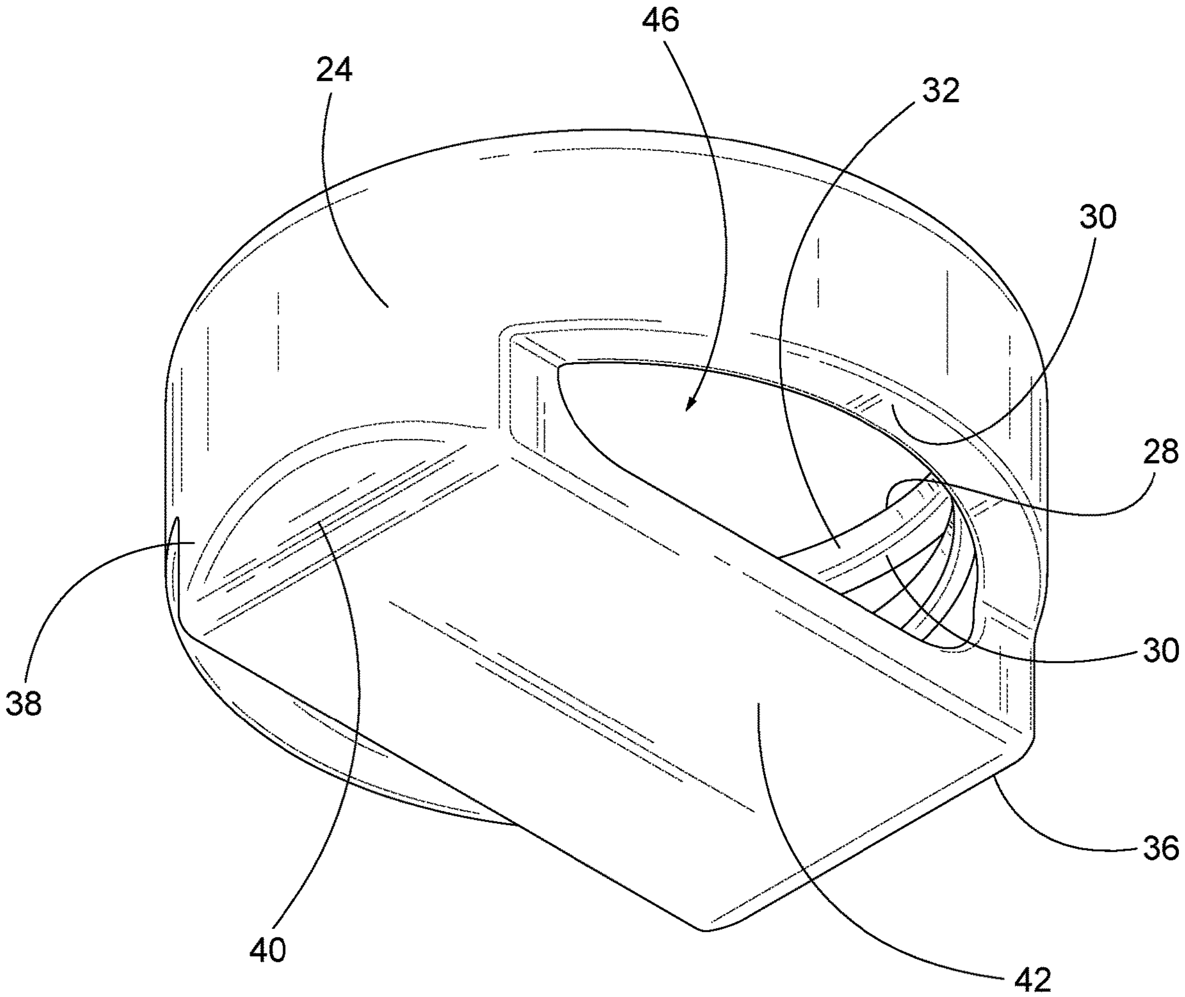
FIG. 3 is an enlarged perspective view of the bottom and other side of the retaining part.
Figure 4:
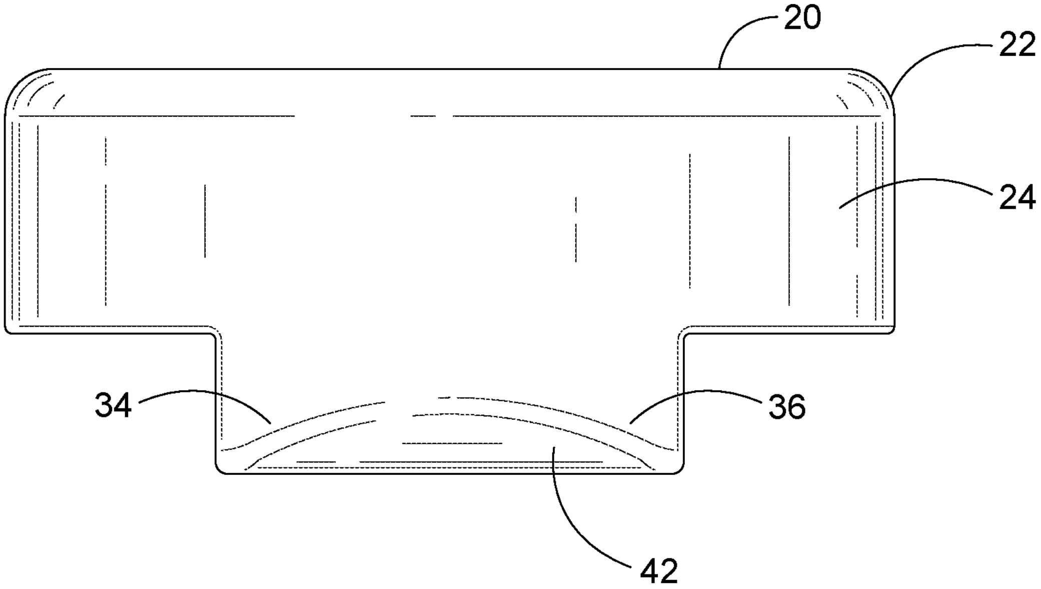
FIG. 4 is an enlarged elevation view of one side of the retaining part.
Figure 5:
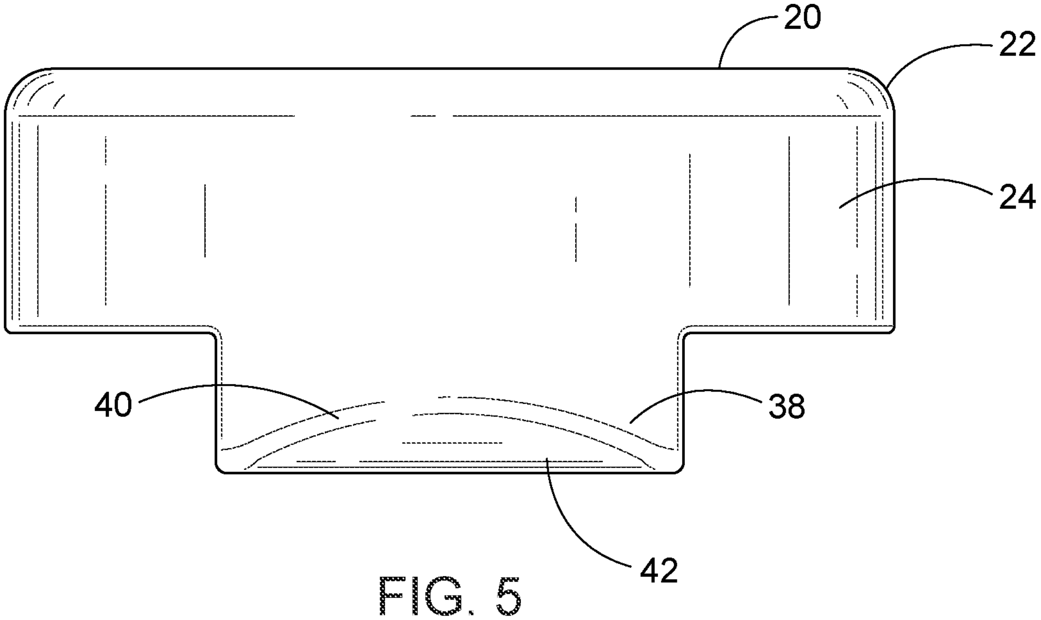
FIG. 5 is an enlarged elevation view of the other side of the retaining part.

As best seen in FIGS. 2 and 3, retaining part 20 has a wall 22 including an exterior surface 24 and an interior surface 26. Wall 22 has a cylindrical shape with a round open top defined by an inwardly extending top edge 28 and a round open bottom defined by an inwardly extending collar which is spaced from the top edge 28 of wall 22. The top edge 28 of the wall and the collar 30 define a recess 32 in the interior surface 26 of the wall.

Figure 6:
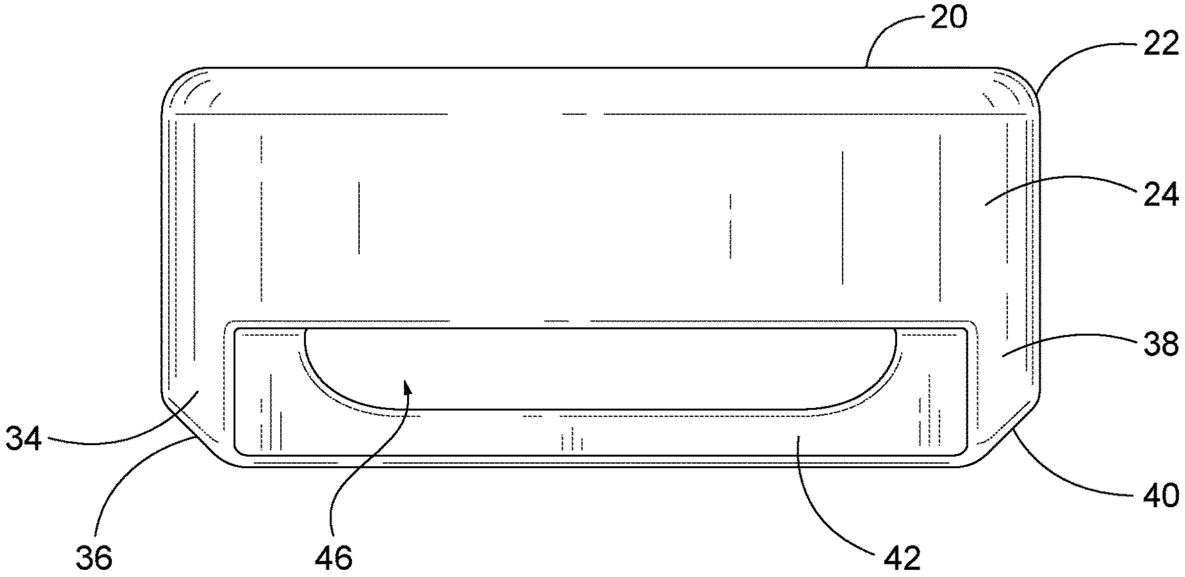
FIG. 6 is an enlarged elevation view of the front of the retaining part.
Figure 7:
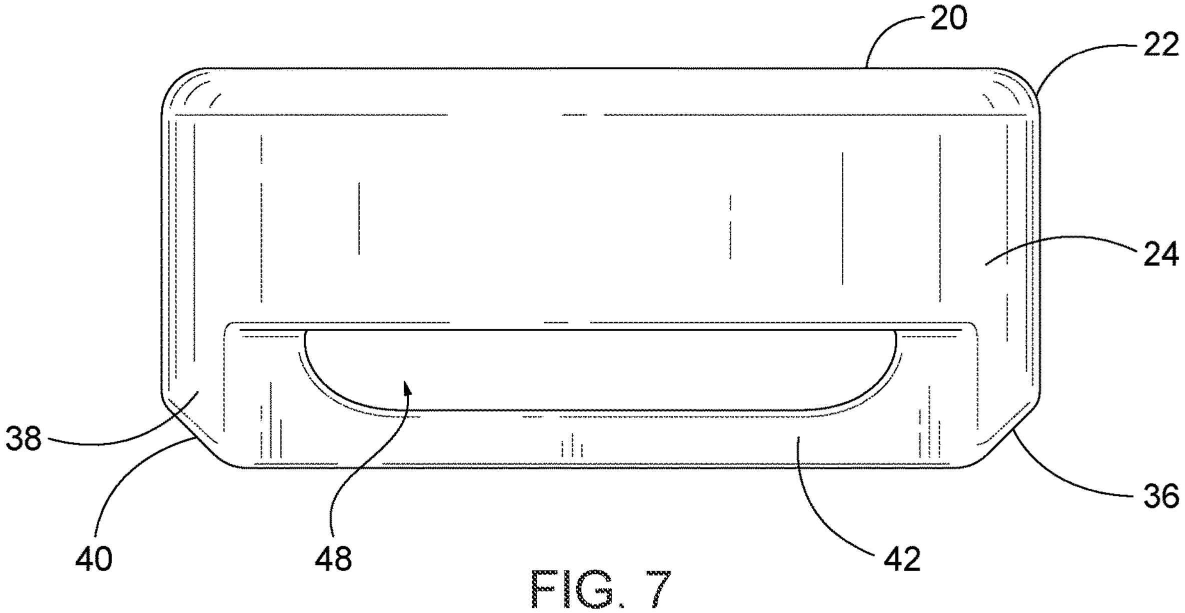
FIG. 7 is an enlarged elevation view of the rear of the retaining part.
Figure 8:
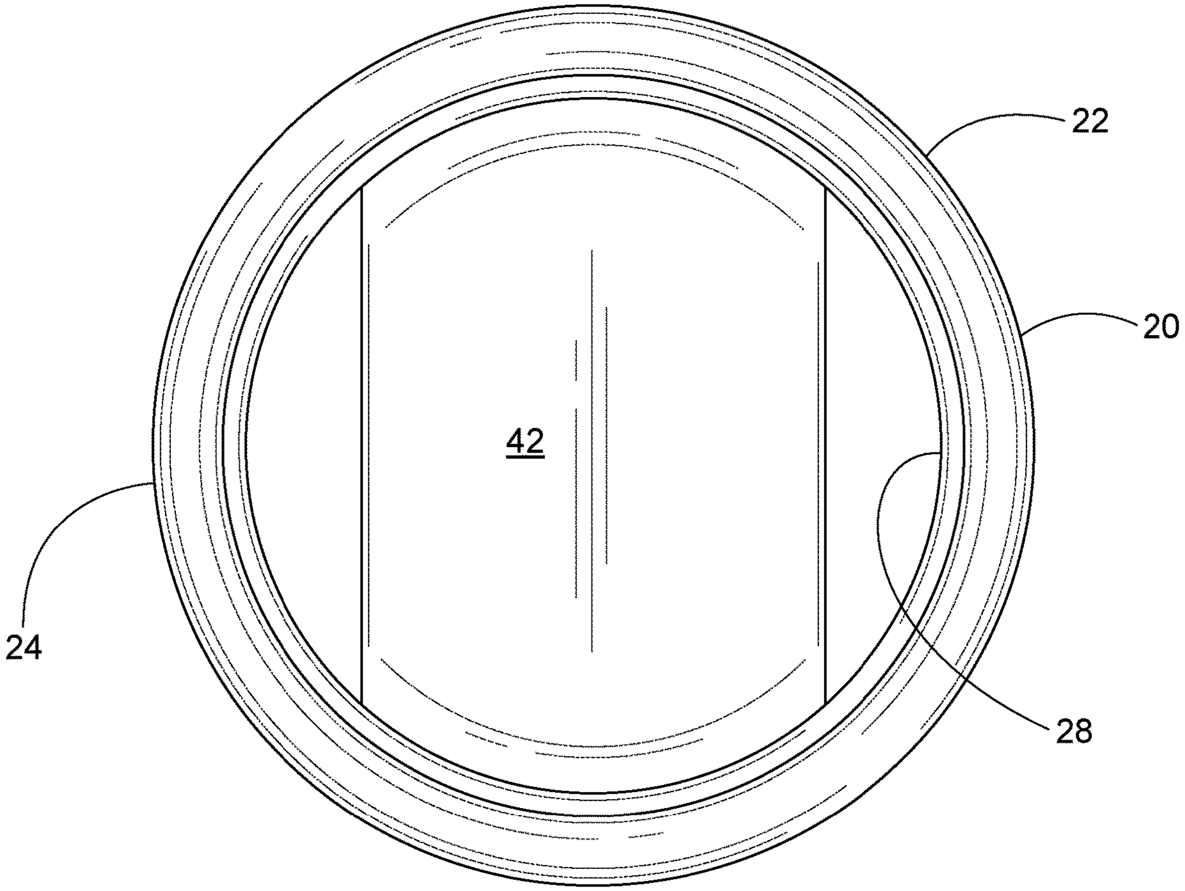
FIG. 8 is an enlarged plan view of the top of the retaining part.
Figure 9:
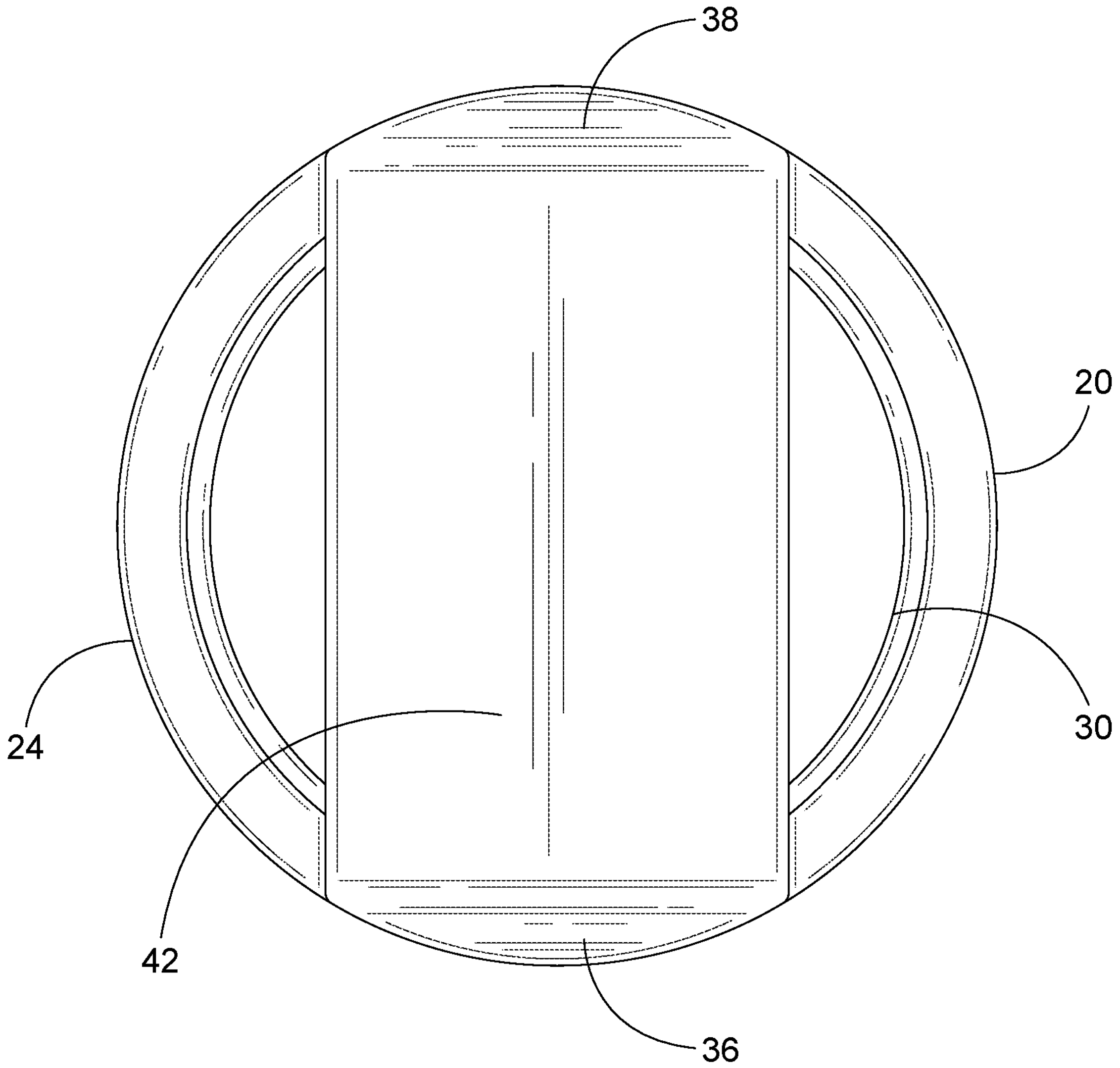
FIG. 9 is an enlarged plan view of the bottom of the retaining part.

Wall 22 has a first arcuate wall extension 34 including an inclined external end 36. It has a second arcuate wall extension 38 including an inclined external end 40. Extensions 34 and 38 are parallel to each other and located on opposite sides of wall 22. As best seen in FIGS. 6 and 7, at least one of the first arcuate wall extension ends and the second arcuate wall extension ends is inclined or beveled.

A connecting member 42 extends between the first wall extension end 36 and the second wall extension end 40. The wall extensions and the connecting member define aligned openings 46 and 48 in opposite sides of the plastic part. The aligned openings 46, 48 are adapted to receive the watchband 16.

Watch 12 has a circular exterior side including a first circumferential side portion 50 and a second circumferential side portion 52. The first circumferential side portion 50 has a diameter smaller than the diameter of the second circumferential side portion 52. When watch 12 is received within the plastic part wall 22, the second circumferential side portion 52 of the watch is situated within recess 32, adjacent collar 30. In that position, first circumferential side portion 50 is within the top edge 28 of wall 22 such that the top face 14 of the watch is visible through the open top of plastic part 20.

Tracking device 18 is inserted into the retaining part through one of the aligned openings 46, 48. The openings 46, 48 are slightly smaller than the diameter of tracking device 18. The retaining part is made of material that is flexible enough to stretch to permit tracking device 18 to pass through one of the openings 46, 48 and be seated with the retaining part wall 22. The tracking device 18 has a circular exterior wall 54. The tracking device wall 54 is received in collar 30 in the interior surface of retaining part wall 22.

With watch 12 in place in the retaining part and the watchband extending through the aligned openings 46, 48, the tracking device 18 is securely retained between watchband 16 and watch 12.

Watchband 16 is preferably formed of a spring-like metal strip embedded within a plastic cover, commonly called a "slap" watchband. The plastic cover may be imprinted with colorful images to be attractive to a child. However, the watchband can be a solid band made of other materials such as leather, silicone etc. and have a different method of disclosure such as a snap or buckle.

The retaining part itself may be translucent, opaque, or colored.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. An assembly comprising a watch with a top face, a watchband, a tracking device and a retaining part for engaging said watchband and retaining said watch and said tracking device, said retaining part comprising a wall including an exterior surface and an interior surface, said wall having a cylindrical shape with a round open top defined by an inwardly extending edge and a round open bottom defined by an inwardly extending collar spaced from said top edge, said top edge and said collar defining a recess in said interior surface, said wall comprising a first arcuate wall extension including an end, a second arcuate wall extension including an end and a connecting member extending between said first wall extension end and said second wall extension end to define aligned openings in opposite sides of said wall, said aligned openings being adapted to receive said watchband through said openings, said watch comprising a circular exterior side including a first circumferential side portion and a second circumferential side portion, said first circumferential side portion having a diameter smaller than the diameter of said second circumferential side portion, such that when said watch is received within said retaining part wall, said second circumferential side portion of said watch is situated within said recess and said top face of said watch is visible through said open top of said retaining part, said tracking device comprising a circular exterior wall adapted to be situated within said collar, between said watchband and said watch.

2. The assembly of claim 1 wherein said retaining part is formed of flexible material including at least one of silicone, rubber or plastic.

3. The assembly of claim 1 wherein said watchband is a slap watchband.

4. The assembly of claim 1 wherein said assembly is adapted for use by a child, an elderly person or a disabled person.

5. The assembly of claim 1 wherein said wall is translucent or opaque.

6. The assembly of claim 1 wherein at least one of said first arcuate wall extension end and said second arcuate wall extension end is inclined.

7. A retaining part for use with a watch with a top face, a watchband and a tracking device having a circular exterior wall, the retaining part engaging the watchband and retaining the watch and the tracking device, the retaining part comprising a wall including an exterior surface and an interior surface, said wall having a cylindrical shape with a round open top defined by an inwardly extending edge and a round open bottom defined by an inwardly extending collar spaced from said top edge, said top edge and said collar defining a recess in said interior surface, said wall comprising a first arcuate wall extension including an end, a second arcuate wall extension including an end and a connecting member extending between said first wall extension end and said second wall extension end to define aligned openings in opposite sides of said wall, aligned openings being adapted to receive the watchband through said openings, the watch has an circular exterior side including a first circumferential side portion and a second circumferential side portion, the first circumferential side portion having a diameter smaller than the diameter of the second circumferential side portion, such that when the watch is received within the retaining part wall, the second circumferential side portion of the watch is situated within said recess and the top face of the watch is visible through said open top of the retaining part, the circular exterior wall of the tracking device is situated within said collar, between the watchband and the watch.

8. The retaining part of claim 7 formed of flexible material including at least one of silicone, rubber or plastic.

9. The retaining part of claim 7 wherein the watchband is a slap watchband.

10. The retaining part of claim 7 adapted for use by a child, an elderly person or a disabled person.

11. The retaining part of claim 7 being translucent or opaque.

12. The retaining part of claim 7 wherein at least one of said first arcuate wall extension end and said second arcuate wall extension end is inclined.

* * * * *